(12) United States Patent
Bae et al.

(10) Patent No.: US 9,237,360 B2
(45) Date of Patent: Jan. 12, 2016

(54) ELECTRONIC DEVICE AND CONTROL METHOD THEREOF

(71) Applicant: Samsung Electronics Co., Ltd., Suwon-si (KR)

(72) Inventors: Sung-joong Bae, Suwon-si (KR); Sung-jun Ham, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 54 days.

(21) Appl. No.: 14/281,154

(22) Filed: May 19, 2014

(65) Prior Publication Data

US 2015/0071603 A1    Mar. 12, 2015

(30) Foreign Application Priority Data

Sep. 12, 2013    (KR) .......................... 10-2013-0109494

(51) Int. Cl.

| | |
|---|---|
| H04N 9/80 | (2006.01) |
| H04N 21/00 | (2011.01) |
| H04N 21/41 | (2011.01) |
| H04N 21/436 | (2011.01) |
| H04N 21/4363 | (2011.01) |
| H04N 21/45 | (2011.01) |

(52) U.S. Cl.
CPC ........... *H04N 21/00* (2013.01); *H04N 21/4113* (2013.01); *H04N 21/4126* (2013.01); *H04N 21/43615* (2013.01); *H04N 21/43637* (2013.01); *H04N 21/4516* (2013.01)

(58) Field of Classification Search
CPC ....................................................... H04N 5/93
USPC .......... 386/239, 245, 248, 261, 262, 323, 326
See application file for complete search history.

(56) References Cited

U.S. PATENT DOCUMENTS

| | | | |
|---|---|---|---|
| 7,218,340 B2* | 5/2007 | Takahashi | H04N 7/183 348/65 |
| 2009/0198744 A1 | 8/2009 | Nakamura | |
| 2010/0017821 A1 | 1/2010 | Leonov et al. | |
| 2011/0110530 A1 | 5/2011 | Kimura | |
| 2012/0016858 A1 | 1/2012 | Rathod | |
| 2012/0243524 A1 | 9/2012 | Verma et al. | |
| 2014/0168453 A1* | 6/2014 | Shoemake | H04N 5/23206 348/207.11 |

OTHER PUBLICATIONS

Communication dated Jan. 5, 2015, issued by the International Searching Authority in counterpart International Application No. PCT/KR2014/008237.

* cited by examiner

*Primary Examiner* — Robert Chevalier
(74) *Attorney, Agent, or Firm* — Sughrue Mion, PLLC

(57) ABSTRACT

An electronic device and control method thereof are provided. The control method includes: initially connecting the electronic device to a data source device; determining whether the connected data source device is registered with the electronic device; registering the data source device in response to determining that the connected data source device is not registered with the electronic device; storing setting information related to at least one of video and audio corresponding to the registered data source device; again connecting the electronic device to the data source device; receiving at least one of second video and second audio from the data source device; and outputting at least one of the second video and the second audio based on the stored setting information.

19 Claims, 7 Drawing Sheets

ELECTRONIC DEVICE AND CONTROL METHOD THEREOF

CROSS-REFERENCE TO RELATED APPLICATION

This application claims priority from Korean Patent Application No. 10-2013-0109494, filed on Sep. 12, 2013 in the Korean Intellectual Property Office, the disclosure of which is incorporated herein by reference in its entirety.

BACKGROUND

1. Field

Apparatuses and methods consistent with the exemplary embodiments relate to an electronic device and a control method thereof, and more particularly, to an electronic device and a control method thereof which checks whether a data source device is registered with the electronic device when the electronic device is connected to the data source device, and in response to a determination that the data source device is not registered with the electronic device, registers the data source device, and stores setting information of at least one of a video and an audio, and in response to the data source device being again connected to the electronic device, outputs at least one of the video and the audio by using the stored setting information.

2. Description of the Related Art

There are various methods of transmitting a file, like a video, and viewing the video from another device. Such transmission methods include attachment of a picture to a text through a multimedia message; attachment of a file to e-mail; transmission through applications; transmission through cloud service; transmission through Bluetooth; and transmission through Wi-Fi direct.

If a file is transmitted to the data source device by the foregoing transmission method, a receiving device may receive and view videos and audios. However, each device may have different settings for videos and audios. Therefore, the videos and audios received by the receiving device may have a setting that is not desired by a user when they are output.

Since a user should change the setting of videos and audios, such as resolution and sound whenever the user receives the videos and audios in order to view and listen to them, the user may feel inconvenienced.

SUMMARY

One or more exemplary embodiments provide an electronic device and a control method thereof which checks whether a data source device is registered with the electronic device when the electronic device is connected to the data source device, and in response to a determination that the data source device is not registered with the electronic device, registers the data source device, and stores setting information of at least one of a video and an audio, and in response to the data source device being again connected to the electronic device, outputs a video and an audio as desired by a user, by using the stored setting information.

According to an aspect of an exemplary embodiment, there is provided an electronic device including: a wireless communicator configured to be wirelessly connected to a data source device and receive video and audio transmitted from the data source device; a data processor configured to process the received video and audio; a video output configured to output the processed video; an audio output configured to output the processed audio; a storage which is configured to store setting information related to the video and the audio; and a controller configured to determine whether the data source device is registered with the electronic device in response to the electronic device being initially connected to the data source device, register the data source device and store in the storage setting information related to at least one of the video and the audio corresponding to the registered data source device in response to determining that the data source device is not registered with the electronic device, and in response to at least one of second video and second audio being transmitted by the data source device when the electronic device is again connected to the data source device, output at least one of the second video and the second audio based on the stored setting information.

The controller may be configured to change setting information of at least one of a video and an audio that is transmitted by the data source device, corresponding to setting information of at least one of a video and an audio of the electronic device.

The electronic device further may include a user interface (UI) generator configured to generate a UI to change the setting information, wherein the controller may compare the setting information of at least one of the video and the audio, with the setting information of at least one of the video and the audio of the electronic device, and in response to the setting information not being identical, changes the setting information of at least one of the video and the audio by using the generated UI.

The controller may be configured to register the data source device by using inherent information of the data source device regarding a wireless connection.

The controller may be configured to determine whether a wireless connection to the data source device is a particular wireless connection, and stores the changed setting information of at least one of the video and the audio of the data source device based on a result of the determination.

The controller may be configured to output at least one of a video and an audio based on the setting information of at least one of the video and the audio of the electronic device in response to the electronic device being disconnected from the data source device.

According to an aspect of another exemplary embodiment there is provided a control method of an electronic device including: initially connecting the electronic device to a data source device; determining whether the connected data source device is registered with the electronic device; registering the data source device in response to determining that the connected data source device is not registered with the electronic device; storing setting information related to at least one of video and audio corresponding to the registered data source device; again connecting the electronic device to the data source device; receiving at least one of second video and second audio from the data source device; and outputting at least one of the second video and the second audio based on the stored setting information.

The storing may include changing setting information of at least one of a video and an audio that is transmitted by the data source device, corresponding to setting information of at least one of the video and the audio of the electronic device.

The storing may include comparing the setting information of at least one of the video and the audio with setting information of a video and an audio of the electronic device; and changing setting information of at least one of the video and the audio by using a UI to change the setting information of at least one of the video and the audio in response to the setting information being different based on the result of the comparison.

The registering may include registering the data source device by using inherent information of the data source device regarding a wireless connection.

The storing may include determining whether the wireless connection of the electronic device to the data source device is a particular wireless connection; and storing the changed setting information of at least one of the video and the audio of the data source device based on a result of the determining.

The control method further may include outputting at least one of a video and an audio based on the setting information of at least one of the video and the audio of the electronic device in response to the electronic device being disconnected from the data source device.

According to an aspect of another exemplary embodiment there is provided an electronic device including: a wireless communicator configured to be wirelessly connected to a data source device; a data processor configured to process at least one of video and audio; a storage; and a controller configured to determine whether the data source device is registered with the electronic device in response to the electronic device being initially connected to the data source device, register the data source device and store in the storage setting information corresponding to the data source device in response to determining that the data source device is not registered with the electronic device, and in response to the electronic device being subsequently reconnected to the data source device and receiving at least one of video and audio from the data source device, control the data processor to process the received at least one of the video and the audio to be output based on the stored setting information.

The electronic device further may include a video output configured to output the processed video.

The electronic device further may include an audio output configured to output the processed audio.

The setting information may be information related to an output format of at least one of the video and the audio which corresponds to the registered data source device.

The controller may be configured to change setting information related to at least one of video and audio that is transmitted by the data source device, which corresponds to setting information related to at least one of video and audio of the electronic device.

The controller may be configured to register the data source device by using inherent information related to the data source device regarding a wireless connection.

The controller may be configured to determine whether a wireless connection to the data source device is a particular wireless connection, and store the changed setting information related to at least one of the video and the audio of the data source device, based on a result of the determination.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
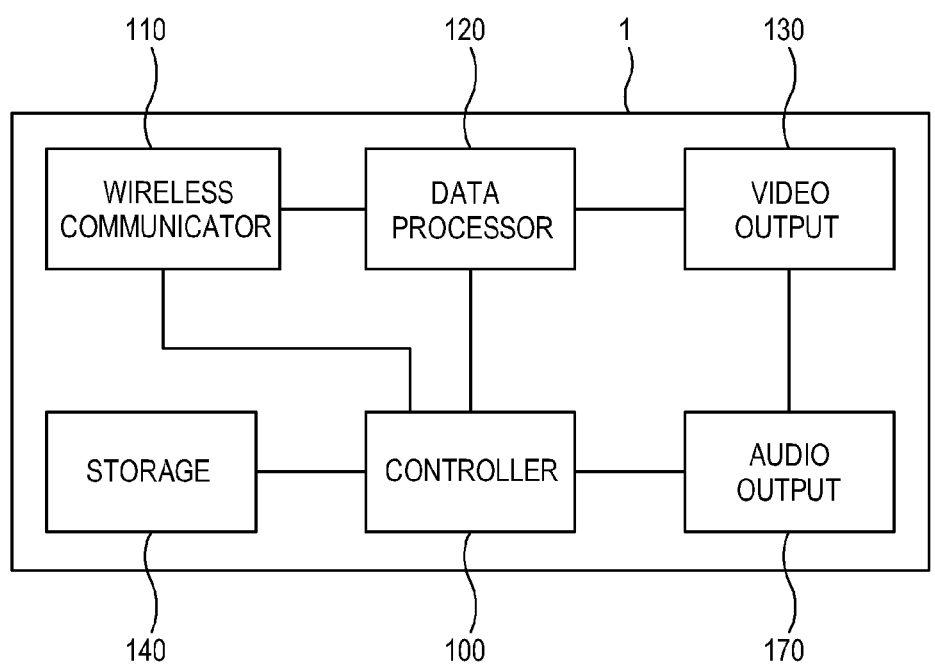
FIG. 1 is a block diagram of an electronic device according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a block diagram of an electronic device 1 according to an exemplary embodiment. As shown therein, the electronic device 1 according to the exemplary embodiment may include a wireless communicator 110, a data processor 120, a video output 130, a storage 140, an audio output 170, and a controller 100. The electronic device 1 according to the exemplary embodiment may be implemented as a smart display apparatus (a smart phone, a laptop computer, and a monitor) including a smart television (TV), a set-top box, a beam projector, a home theater, etc.

The wireless communicator 110 may receive a signal from an external input, and may transmit the signal to the data processor 120 or the controller 100. The wireless communicator 110 may receive signals in a wired manner according to preset wireless communication standards.

The wireless communicator 110 may receive broadcast signals; video signals and data signals from an external input connected to the electronic device 1, or receive communication data through a communication network.

The wireless communicator 110 may further include various additional elements such as a tuner to tune a broadcasting signal as well as those for receiving signals/data from an external input including a wireless communication module for wireless communication, depending on a design of the electronic device 1. The wireless communicator 110 may transmit information/data/signals of the electronic device 1 to an external device as well as receive signals from the external device. That is, the wireless communicator 110 may not be limited to receiving signals from an external device, and may be implemented as an interface for interactive communication. The wireless communicator 110 may receive control signals for selecting a user interface (UI) from a plurality of control devices. The wireless communicator 110 may include a communication module for known near field communication (NFC) such as Bluetooth, infrared (IR), ultra wideband (UWB) and Zigbee. The wireless communicator 110 may be used for various purposes including transmission and reception of commands for display manipulation and of data in addition to of control signals for selecting a UI. The wireless communicator 110 may be provided by known technology which may transmit files at high speed without any wireless router such as Wi-Fi direct.

The type of a data processing process performed by the data processor 120 may include, without limitation, decoding corresponding to a video format of video data, de-interlacing for converting interlace video data into progressive video data, scaling to adjust video data into a preset resolution, noise reduction to improve video quality, detail enhancement, frame refresh rate conversion, etc.

The data processor 120 may be implemented as a system-on-chip (SoC) which integrates the aforementioned functions or as an image processing board (not shown) that is formed by installing independent elements which perform the aforementioned processes in a printed circuit board (PCB) to be installed in the electronic device 1.

The data processor 120 processes a broadcast signal including a video signal transmitted through the wireless communicator 110, and a source image including a video signal supplied by an image supply source. The data processor 120 may output the processed video signal to the electronic device 1 by which the processed source image may be displayed.

The video output (display) 130 may display a video thereon based on the video signal output by the data processor 120. The video output 130 may be implemented as various displays including, without limitation, liquid crystal, plasma, light-emitting diode, organic light-emitting diode, surface-conduction electron-emitter, carbon nano-tube, and nano-crystal.

The video output 130 may further include additional elements depending on implementations of various embodiments. For example, the video output 130 may be implemented as a liquid crystal display, may include a liquid crystal display (LCD) panel, a backlight unit emitting light to the LCD panel and a panel driving substrate which drives the LCD panel.

The video output 130 displays a video thereon based on the video signal processed by the data processor 120. The video output 130 may include a LCD panel, a plasma display panel (PDP), an organic light emitting diode (OLED) panel, etc. to display a video thereon.

The storage 140 may include a writable ROM in which data remains even upon cutoff of power to the electronic device 1, and to reflect any change with respect to a user. That is, the storage 140 may be implemented as one of a flash memory, an erasable programmable read only memory (EPROM) and an electrically erasable programmable read only memory (EEPROM). The storage 140 may store therein setting information related to a video.

The audio output 170 may output an audio signal processed by the data processor 120. The audio output 170 may control an audio with respect to volume and sound by control of controller 100. The audio output 170 may adjust volume and sound according to various sound modes.

In response to the electronic device 1 being initially connected to data source devices 2 to 5 (see FIG. 7), the controller 100 determines registration or non-registration of the data source devices 2 to 5 with the electronic device 1. In response to a determination that the data source devices 2 to 5 are not registered with the electronic device 1, the controller 100 registers the data source devices 2 to 5, and stores in the storage 140 setting information related to at least one of a video and an audio corresponding to the registered data source devices 2 to 5. In response to the electronic device 1 being secondly connected to the data source devices 2 to 5 again, and at least one of a video and an audio being transmitted by the data source devices 2 to 5 to the electronic device 1, the controller 100 may output at least one of the video and the audio based on the stored setting information.

Figure 2:
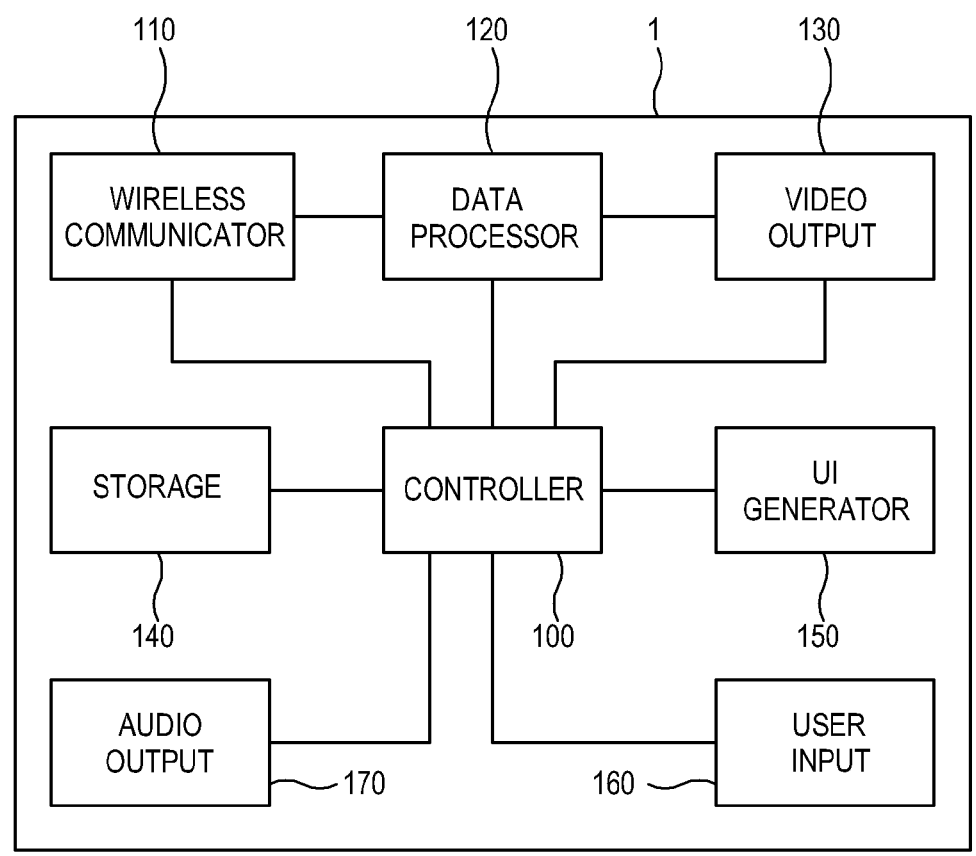
FIG. 2 is a block diagram of an electronic device according to another exemplary embodiment.

FIG. 2 is a block diagram of an electronic device 1 according to another exemplary embodiment. The electronic device 1 according to the another exemplary embodiment, as shown in FIG. 2, may include the elements shown in FIG. 1, and may further include a user interface (UI) generator 150, and a user input 160.

The UI generator 150 may generate a UI to execute an application program. The generated UI includes a plurality of sub UIs which are provided in the form of icons or texts. In response to a user selecting a particular sub UI through the electronic device 1, the application program may be executed corresponding to the selected sub UI. That is, respective sub UIs may be generated for a plurality of functions or events to execute the application program that operates in the electronic device 1.

The UI generator 150 may be implemented as software and/or hardware to generate and control a UI displayed by the video output 130, and such functions may be performed by the controller 100 (to be described later). That is, the UI generator 150 may not be necessarily implemented as an additional chipset or an additional microprocessor. The UI generator 150 may generate a UI to change setting information of a video of the electronic device 1.

The user input 160 transmits preset various control commands or information to the controller 100 by a user's manipulation and input. The user input 160 is implemented as a menu key or an input panel that is installed in an external side of the electronic device 1, or as a remote controller that is separated/spaced from a user terminal. Otherwise, the user input 160 may be integrally formed in the video output 130. If the video output 130 is a touch screen, a user may touch an input menu (not shown) displayed by the video output 130 in order to transmit a preset command to the controller 100.

The user input 160 receives a user's motion. A user's motion includes a touch input. The user input 160 may directly receive a user's motion, or may receive information related to a user's motion from an external device.

The controller 100 may change setting information of at least one of a video and an audio which is transmitted by the data source devices 2 to 5, which corresponds to setting information of at least one of a video and an audio of the electronic device 1. A size of a video frame of a video that is transmitted by the data source devices 2 to 5 may be different from a setting of at least one of a video and an audio related to the electronic device 1. For example, a video frame that is transmitted by the data source devices 2 to 5 is 1280×1024. However, a screen setting of the electronic device 1 regarding a video may be 1920×1080. In such a case, the transmitted video may be displayed in a smaller size rather than being displayed in an entire screen of the video output 130 of the electronic device 1. To prevent the foregoing case, the controller 100 may change the setting of the transmitted video frame from 1280×1024 to 1920×1080 to display the video in the entire screen of the video output 130. A resolution of the transmitted video may be changed contrary to a user's desire, but it may be adjusted by a user. This also applies to an audio signal.

The controller 100 may compare setting information of at least one of a video and an audio, with setting information of at least one of a video and an audio of the electronic device 1. In response to the setting information not being identical, based on the comparison, the controller 100 may change the setting information of at least one of the video and the audio by using the generated UI. By changing the setting information, a transmitted video frame may be enlarged or reduced. A UI may be provided to various setting information. For example, a user may change setting information including sound/resolution/volume/brightness/contrast/chroma, etc., through a UI.

The controller 100 may register the data source devices 2 to 5 by using inherent information of the data source devices 2 to 5 regarding a wireless connection. For example, if a user receives at least one of a video and an audio from a smart phone of his/her friend through a user's smart phone by a wireless communication such as Wi-Fi direct, and if the friend's smart phone is connected to the user's smart phone through Wi-Fi direct, a user may register the friend's smart phone that is connected to a user's smart phone through Wi-Fi direct. The controller 100 may determine whether the wireless connection to the data source devices 2 to 5 is a particular wireless connection, and based on the determination result, may store changed setting information of at least one of a video and an audio of the data source devices 2 to 5. In response to the electronic device 1 being wirelessly connected to the data source devices 2 to 5 and receiving at least one of a video and an audio therefrom, the controller 100 may determine what wireless connection has been used. The controller 100 may store setting information according to connection methods, and in response to the electronic device 1 again being connected to the data source devices 2 to 5 by the same connection method, may output at least one of a video and an audio by using the stored data.

Figure 3:
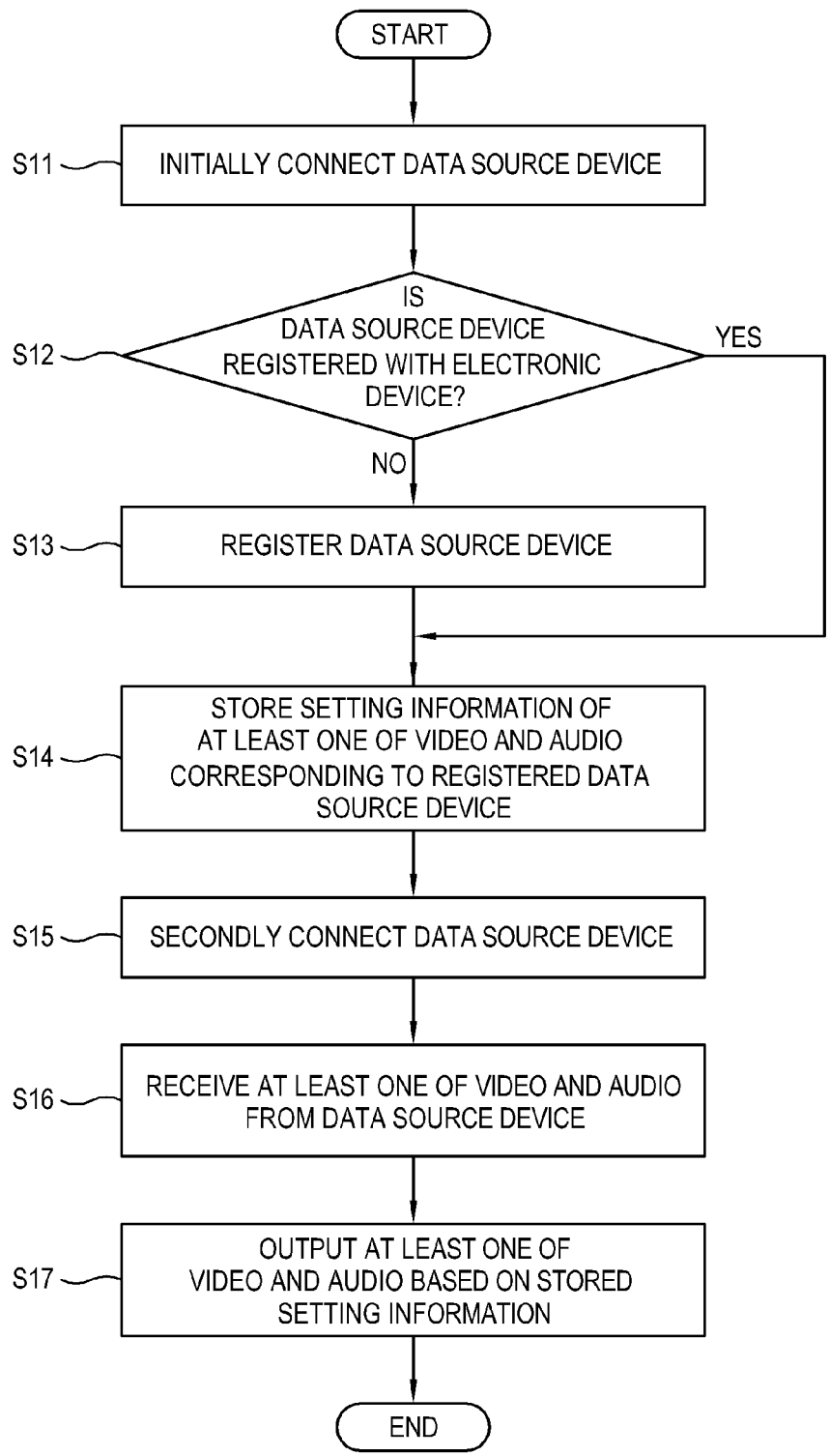
FIG. 3 is a control flowchart showing operations of the electronic device according to an exemplary embodiment.

FIG. 3 is a control flowchart showing operations of the electronic device 1 according to an exemplary embodiment.

The electronic device 1 is initially connected to the data source devices 2 to 5 (S11).

The controller 100 searches and determines whether the data source devices 2 to 5 are the data source devices that are registered with the electronic device 1 (S12).

In response to determining that the data source devices 2 to 4 are not registered with the electronic device 1, the controller 100 registers the data source devices 2 to 5 (S13). In response to determining that the data source devices 2 to 4 are registered with the electronic device 1, a next operation is performed without registration.

Setting information of at least one of a video and an audio is stored corresponding to the registered data source devices 2 to 5 (S14).

Thereafter, the electronic device 1 is secondly connected to the data source devices 2 to 5 again (S15).

The electronic device 1 receives at least one of a video and an audio from the data source devices 2 to 5 (S16).

At least one of the video and the audio is output based on the stored setting information (S17).

Figure 4:
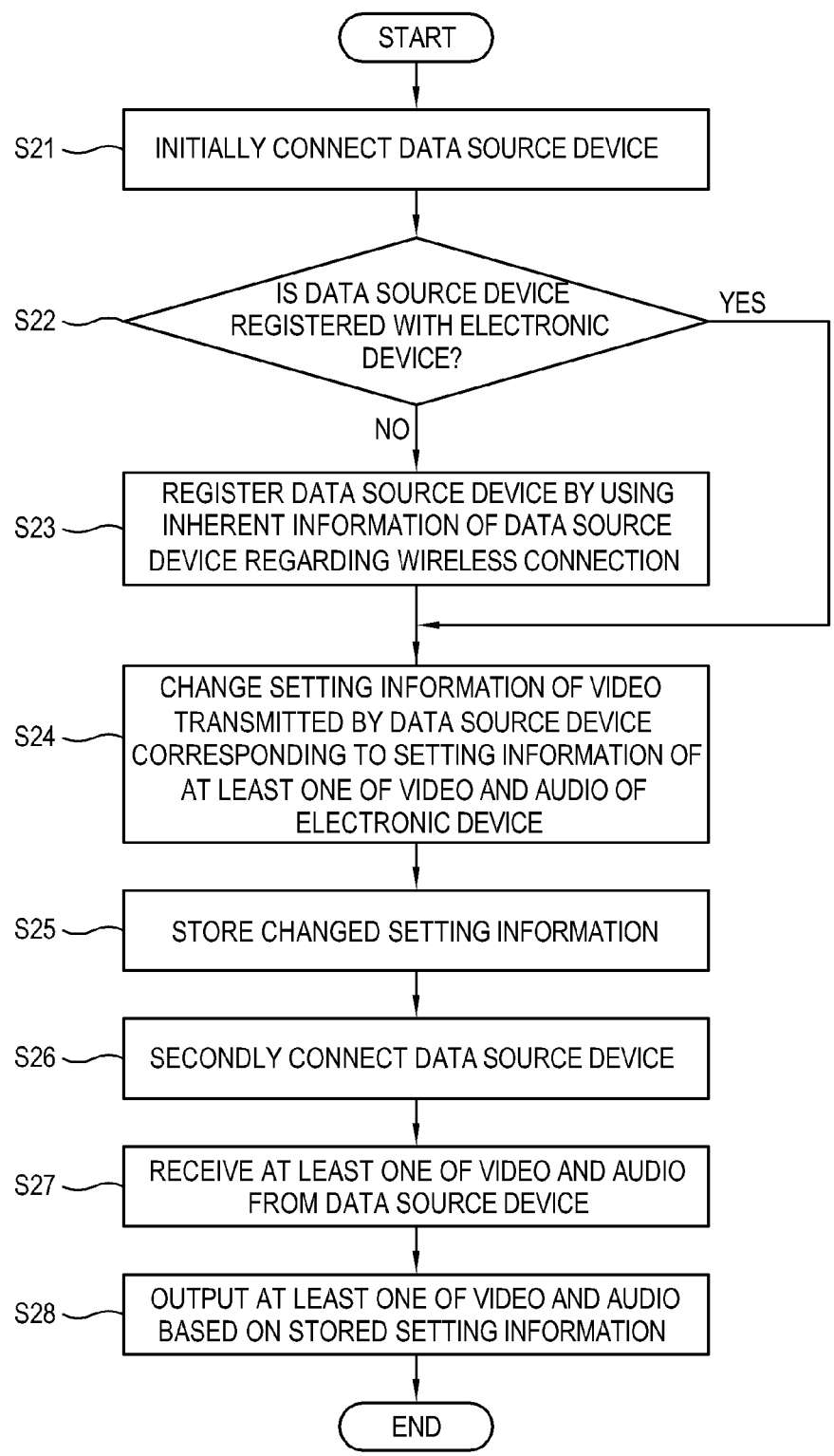
FIGS. 4, 5 and 6 are control flowcharts showing operations of the electronic device according to other exemplary embodiments.

FIG. 4 is a control flowchart showing operations of the electronic device 1 according to another exemplary embodiment.

The electronic device 1 is initially connected to the data source devices 2 to 5 (S21).

The controller 100 searches and determines whether the data source devices 2 to 5 are the data source devices that are registered with the electronic device 1 (S22).

In response to determining that the data source devices 2 to 5 are not registered with the electronic device 1, the controller 100 registers the data source devices 2 to 5 by using inherent information of the data source devices 2 to 5 regarding the wireless connection (S23). In response to determining that the data source devices 2 to 5 are registered with the electronic device 1, a next operation is performed without registration. The inherent information of the data source devices 2 to 5 regarding the wireless connection may include a model name, classification number, serial number, etc., of the data source devices 2 to 5 depending on the type of the wireless connection.

Setting information of at least one of a video and an audio that is transmitted by the data source devices 2 to 5 is changed corresponding to the setting information of at least one of the video and the audio of the electronic device 1 (S24).

The changed setting information is stored corresponding to the registered data source devices 2 to 5 (S25).

Thereafter, the electronic device 1 is secondly connected to the data source devices 2 to 5 again (S26).

The electronic device 1 receives at least one of a video and an audio from the data source devices 2 to 5 (S27).

At least one of a video and an audio is output based on the stored setting information (S28).

Figure 5:
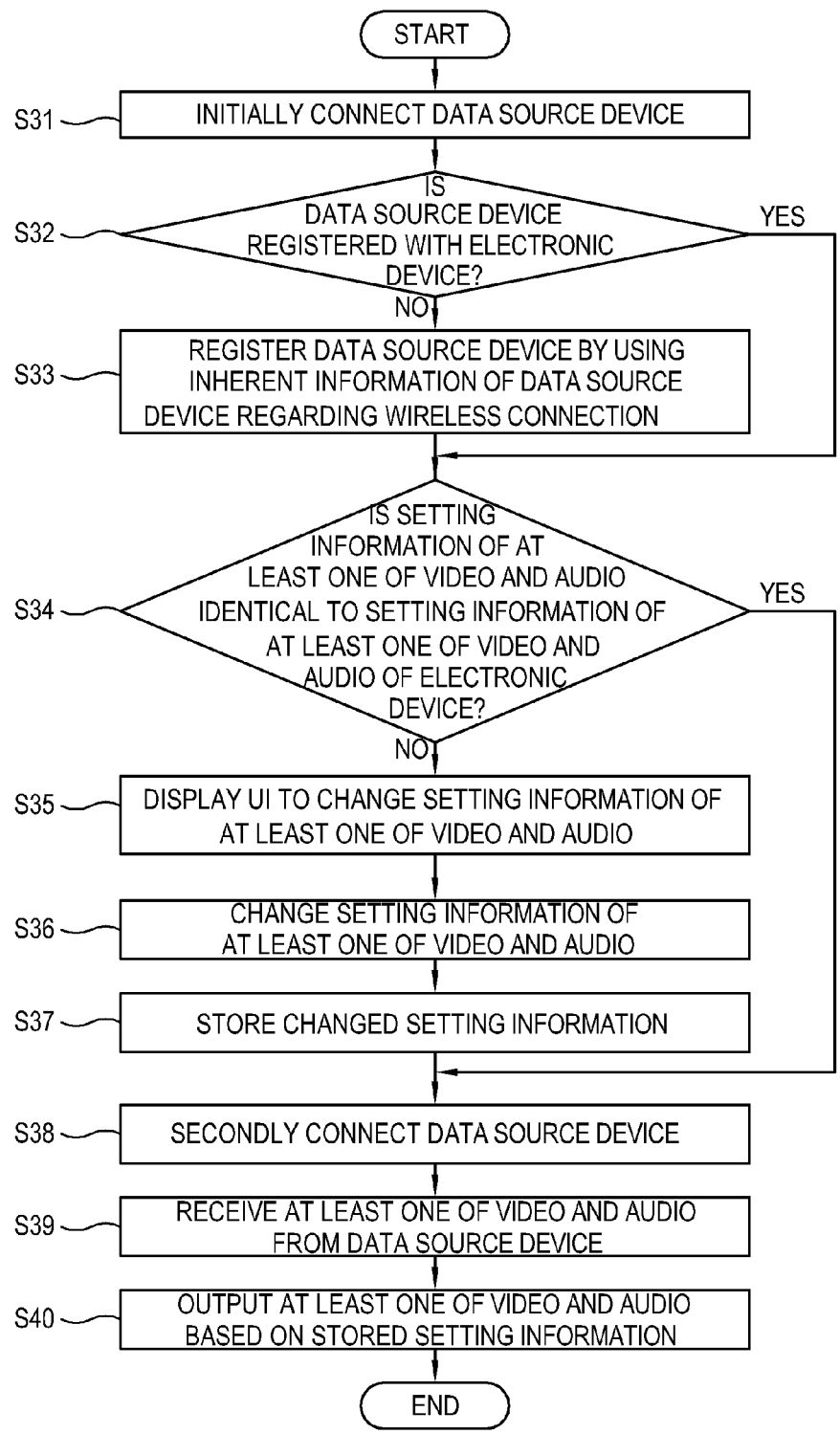

FIG. 5 is a control flowchart showing operations of the electronic device 1 according to another exemplary embodiment.

The electronic device 1 is initially connected to the data source devices 2 to 5 (S31).

The controller 100 searches and determines whether the data source devices 2 to 5 are the data source devices 2 to 5 that are registered with the electronic device 1 (S32).

In response to determining that the data source devices 2 to 5 are not registered with the electronic device 1, the controller 100 registers the data source devices 2 to 5 by using the inherent information of the data source devices 2 to 5 regarding the wireless connection (S33). In response to determining that the data source devices 2 to 5 are registered with the electronic device 1, a next step is performed without registration. The inherent information of the data source devices 2 to 5 regarding the wireless connection may include a model name, classification number, serial number, etc., of the data source devices 2 to 5 depending on the type of wireless connection.

Setting information of at least one of a video and an audio is compared with the setting information of at least one of the video and the audio of the electronic device 1 (S34).

In response to determining that the setting information are not identical based on the result of the comparison, the controller 100 displays a UI to change the setting information of at least one of the video and the audio (S35).

A user changes the setting information of at least one of the video and the audio (S36).

The controller 100 stores the changed setting information corresponding to the registered data source devices 2 to 5 (S37).

In response to determining at operation S34 that the setting information are identical based on the result of the comparison, the operation of displaying the UI and changing and storing the setting information of at least one of the video and the audio is skipped and a next step may be performed. Since a user may set steps, the operation S35 may be performed to display the UI and to change and store the setting information of at least one of the video and the audio.

Thereafter, the electronic device 1 is secondly connected to the data source devices 2 to 5 again (S38).

The electronic device 1 receives at least one of a video and an audio from the data source devices 2 to 5 (S39).

At least one of the video and the audio is output based on the stored setting information (S40).

Figure 6:
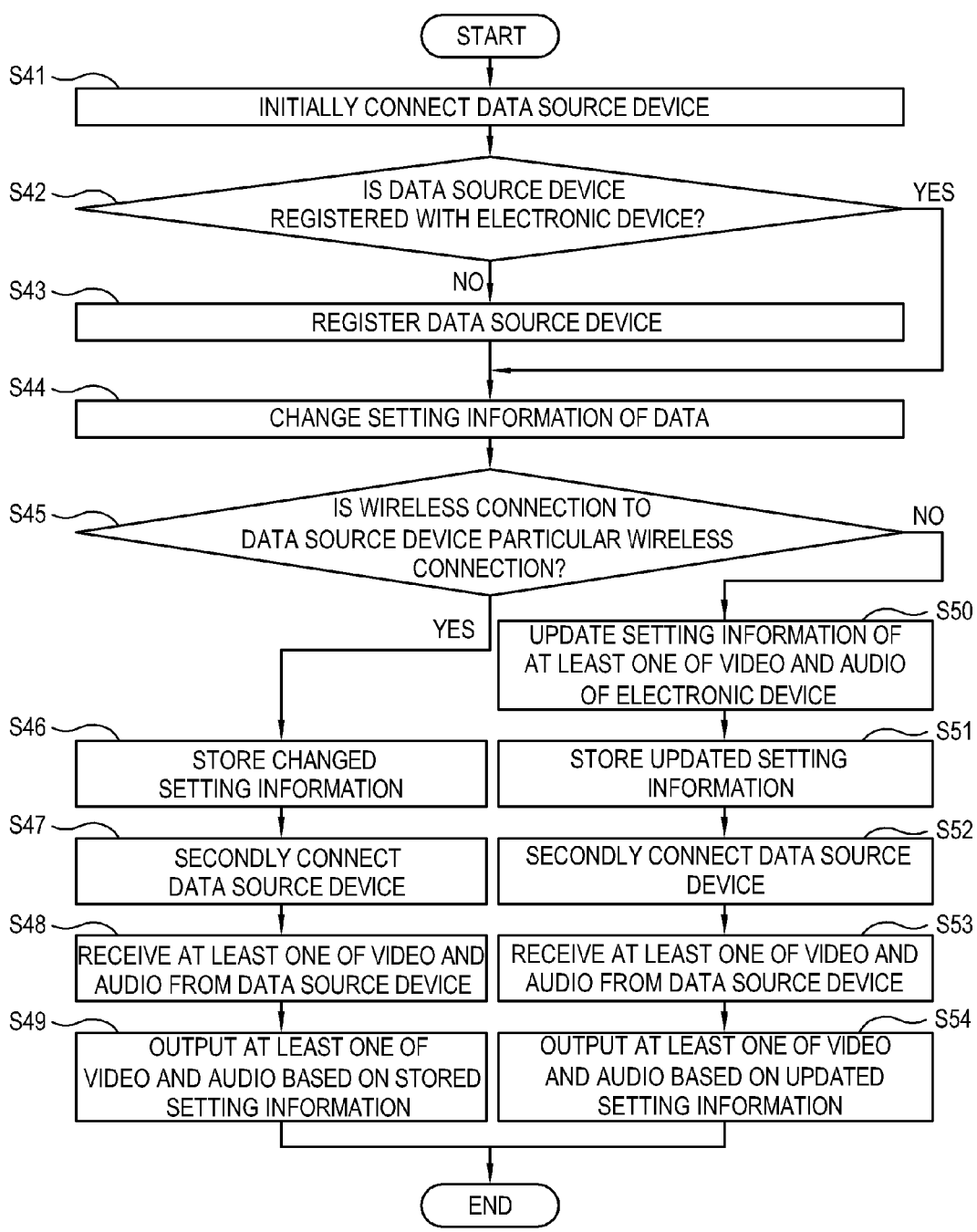

FIG. 6 is a control flowchart showing operations of the electronic device 1 according to another exemplary embodiment.

The electronic device 1 is initially connected to the data source devices 2 to 5 (S41).

The electronic device 1 searches and determines whether the data source devices 2 to 5 are the data source devices that are registered with the electronic device 1 (S42).

In response to determining that the data source devices 2 to 5 are not registered with the electronic device 1, the controller 100 registers the data source devices 2 to 5 (S43).

A user changes the setting information of at least one of the video and the audio (S44).

The controller 100 determines whether the connection of the electronic device 1 to the data source devices 2 to 5 is the particular wireless connection (S45).

In response to determining that the connection of the electronic device 1 to the data source devices 2 to 5 is the particular wireless connection, the changed setting information is stored corresponding to the data source devices 2 to 5 (S46).

Thereafter, the electronic device 1 is secondly connected to the data source devices 2 to 5 again (S47).

The electronic device 1 receives at least one of a video and an audio from the data source devices 2 to 5 (S48).

At least one of the video and the audio is output based on the stored setting information (S49).

In response to determining at operation S45 that the connection of the electronic device 1 to the data source devices 2 to 5 is not the particular wireless connection but rather is a wired connection, setting information related to at least one of the video and the audio of the electronic device 1 is updated (S50). In response to there being no setting information to be updated, an operation S54 is performed to output at least one of the video and the audio.

The updated setting information is stored corresponding to the data source devices 2 to 5 (S51).

Thereafter, the electronic device 1 is secondly connected to the data source devices 2 to 5 again (S52).

The electronic device 1 receives at least one of a video and an audio from the data source devices 2 to 5 (S53).

At least one of the video and the audio is output based on the stored setting information (S54).

Figure 7:
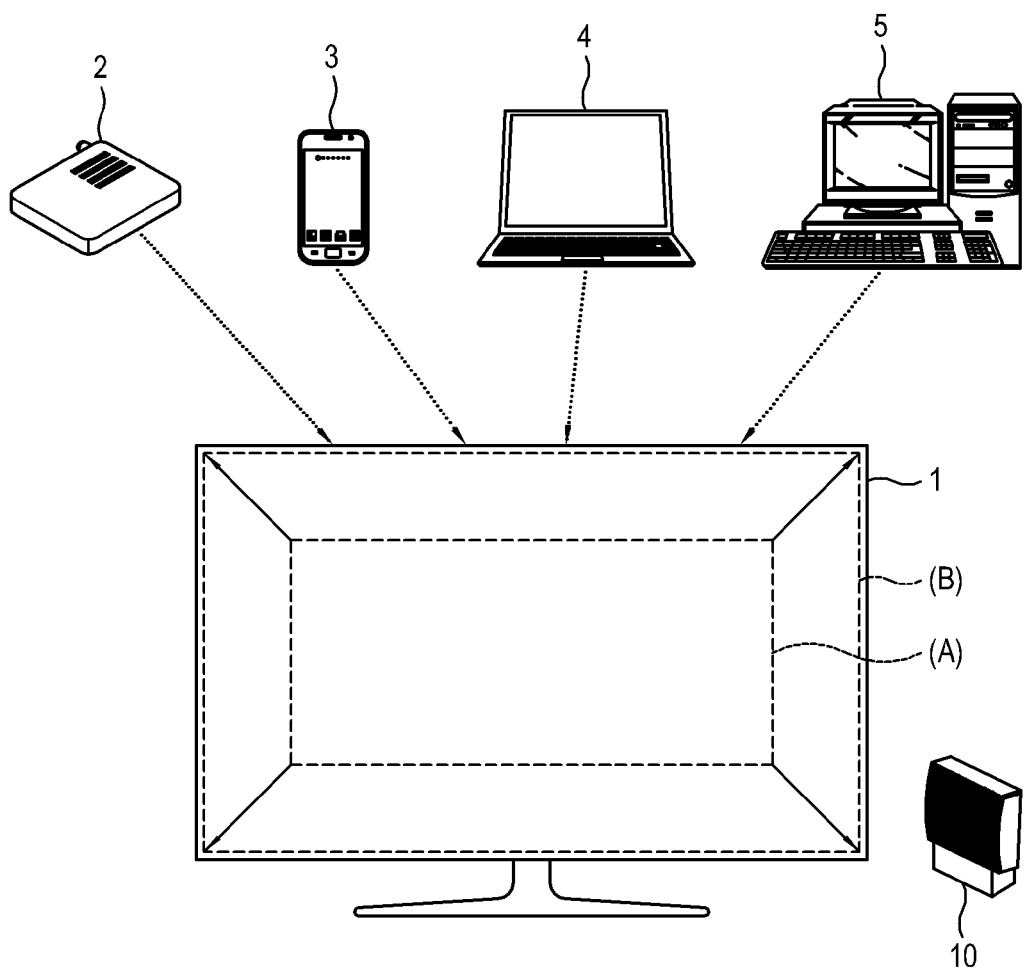
FIG. 7 illustrates an example of the electronic device receiving a video from a data source device and displaying the video according to the another exemplary embodiment.

FIG. 7 illustrates an example of the electronic device 1 that receives a video and an audio from the data source devices 2 to 5 and displays the video and the audio according to the another exemplary embodiment.

For example, the electronic device 1 may be wirelessly connected to a set-top box 2, a smart phone 3, a laptop computer 4 and a computer 5, and may receive a video and an audio therefrom. In response to the electronic device 1 receiving at least one of a video and an audio through a wireless connection and outputs at least one of the video and the audio, the video may be displayed differently from its original state due to a different video size and other various setting information. Since the data source devices 2 to 5 and the electronic device 2 may have different settings for displaying the video, a user should change such settings in order to satisfactorily view video through the electronic device 1.

The electronic device 1 displays the video that is transmitted by the data source devices 2 to 5, based on the original setting of the video, and thus the displayed video may be distorted, and the sound may be distorted as well as the audio and video may not be what a user desires.

After the electronic device 1 is wirelessly connected to one of the set-top box 2, the smart phone 3, the laptop computer 4 and the computer 5, e.g., to the smart phone 3, and receives a video therefrom and displays the video, the video may be displayed in a smaller screen (A) of the electronic device 1 in FIG. 7 because setting information related to the smart phone 3 and the electronic device 1 may be different. A user may then change the screen setting to display the video in a larger/full screen B of the electronic device 1. However, in response to the electronic device 1 being again connected to the smart phone 3, a user should again change the screen setting. Therefore, in response to the electronic device 1 according to this exemplary embodiment being wirelessly connected to the smart phone 3 and receiving video therefrom, the electronic device 1 registers the smart phone 3, changes different setting information related to the video and stores the changed setting information. In response to the electronic device 1 being again wirelessly connected to the smart phone 3 and receiving a video therefrom, the electronic device 1 may display the video based on the stored setting information in order for a user to easily and conveniently view the video.

Setting information related to a sound may be also changed and stored like the setting information related to the screen. A user may then listen to the sound through a speaker 10 that may be included in the electronic device 1 or may listen to sound from a speaker separated from the electronic device.

In response to the electronic device 1 being connected to the data source devices 2 to 5, the electronic device 1 checks whether the data source devices 2 to 5 are registered with the electronic device 1, and in response to the data sources not being registered, registers the data source devices 2 to 5. The electronic device 1 then stores the setting information related to at least one of a video and an audio, and in response to the same data source devices 2 to 5 being again connected to the electronic device 1, the electronic device 1 uses the stored setting information to output at least one of the video and the audio desired by a user. This prevents a repetitive setting changing process which should be otherwise performed whenever the electronic device 1 receives a video from the data source devices 2 to 5. Therefore, the electronic device 1 may receive at least one of the video and the audio and enable a user to easily and conveniently view the video or listen to the audio.

According to the exemplary embodiments, the electronic device checks whether the data source device is registered with the electronic device when the electronic device is connected to the data source device. In response to a determination that the data source device is not registered with the electronic device, the electronic device registers the data source device, stores setting information related to at least one of a video and an audio, and in response to the data source device again being connected to the electronic device, outputs the video and the audio as desired by a user by using the stored setting information. Since the repetitive setting changing process which should be otherwise performed whenever the electronic device receives a video and an audio from the data source device is prevented, the electronic device may receive the video and the audio and enables a user to easily and conveniently view the video and listen to the audio.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. An electronic device comprising:
   a wireless communicator configured to be wirelessly connected to a data source device and receive video and audio transmitted from the data source device;
   a data processor configured to process the received video and audio;
   a video output configured to output the processed video;
   an audio output configured to output the processed audio;
   a storage which is configured to store setting information related to the video and the audio; and
   a controller configured to determine whether the data source device is registered with the electronic device in response to the electronic device being initially connected to the data source device, register the data source device and store in the storage setting information related to at least one of the video and the audio corresponding to the registered data source device in response to determining that the data source device is not registered with the electronic device, and in response to at least one of second video and second audio being transmitted by the data source device when the electronic device is again connected to the data source device, output at least one of the second video and the second audio based on the stored setting information.

2. The electronic device according to claim 1, wherein the controller is configured to change setting information related to at least one of video and audio that is transmitted by the data source device, corresponding to setting information related to at least one of video and audio of the electronic device.

3. The electronic device according to claim 1, further comprising a user interface (UI) generator configured to generate a UI to change the setting information, wherein
the controller is configured to compare the setting information of at least one of the video and the audio corresponding to the registered data source device, with the setting information related to at least one of the video and the audio of the electronic device, and in response to the setting information not being identical, changes the setting information related to at least one of the video and the audio corresponding to the registered data source device by using the generated UI.

4. The electronic device according to claim 1, wherein the controller is configured to register the data source device by using inherent information related to the data source device regarding a wireless connection.

5. The electronic device according to claim 2, wherein the controller is configured to determine whether a wireless connection to the data source device is a particular wireless connection, and store the changed setting information related to at least one of the video and the audio of the data source device, based on a result of the determination.

6. The electronic device according to claim 1, wherein the controller is configured to output at least one of video and audio based on the setting information related to at least one of the video and the audio of the electronic device in response to the electronic device being disconnected from the data source device.

7. A control method of controlling an electronic device, the method comprising:
initially connecting the electronic device to a data source device;
determining whether the connected data source device is registered with the electronic device;
registering the data source device in response to determining that the connected data source device is not registered with the electronic device;
storing setting information related to at least one of video and audio corresponding to the registered data source device;
again connecting the electronic device to the data source device;
receiving at least one of second video and second audio from the data source device; and
outputting at least one of the second video and the second audio based on the stored setting information.

8. The control method according to claim 7, wherein the storing comprises changing setting information related to at least one of video and audio that is transmitted by the data source device, corresponding to setting information related to at least one of video and audio of the electronic device.

9. The control method according to claim 7, wherein the storing comprises comparing the setting information related to at least one of the video and the audio corresponding to the registered data source device with setting information related to video and audio of the electronic device; and
changing setting information related to at least one of the video and the audio by using a user interface (UI) to change the setting information related to at least one of the video and the audio in response to the setting information being different based on the result of the comparison.

10. The control method according to claim 7, wherein the registering comprises registering the data source device by using inherent information related to the data source device with regards to a wireless connection.

11. The control method according to claim 8, wherein the storing comprises determining whether the wireless connection of the electronic device to the data source device is a particular wireless connection; and
storing the changed setting information related to at least one of the video and the audio of the data source device based on the result of the determining.

12. The control method according to claim 7, further comprising outputting at least one of video and audio based on the setting information related to at least one of the video and the audio of the electronic device in response to the electronic device being disconnected from the data source device.

13. An electronic device comprising:
a wireless communicator configured to be wirelessly connected to a data source device;
a data processor configured to process at least one of video and audio;
a storage; and
a controller configured to determine whether the data source device is registered with the electronic device in response to the electronic device being initially connected to the data source device, register the data source device and store in the storage setting information corresponding to the data source device in response to determining that the data source device is not registered with the electronic device, and in response to the electronic device being subsequently reconnected to the data source device and receiving at least one of video and audio from the data source device, control the data processor to process the received at least one of the video and the audio to be output based on the stored setting information.

14. The electronic device of claim 13, further comprising a video output configured to output the processed video.

15. The electronic device of claim 13, further comprising an audio output configured to output the processed audio.

16. The electronic device of claim 13, wherein the setting information is information related to an output format of at least one of the video and the audio which corresponds to the registered data source device.

17. The electronic device of claim 13, wherein the controller is configured to change setting information related to at least one of video and audio that is transmitted by the data source device, which corresponds to setting information related to at least one of video and audio of the electronic device.

18. The electronic device according to claim 13, wherein the controller is configured to register the data source device by using inherent information related to the data source device regarding a wireless connection.

19. The electronic device according to claim 13, wherein the controller is configured to determine whether a wireless connection to the data source device is a particular wireless connection, and store the changed setting information related to at least one of the video and the audio of the data source device, based on a result of the determination.

\* \* \* \* \*